(12) United States Patent
Bartell, Jr. et al.

(10) Patent No.: US 7,249,748 B2
(45) Date of Patent: *Jul. 31, 2007

(54) ELECTRIC MOTOR ACTUATED STOP AND SELF-CLOSING CHECK VALVE

(75) Inventors: Donald L. Bartell, Jr., Beaver Falls, PA (US); Joseph E. Lescovich, Pittsburgh, PA (US); William J. Nicholl, Pittsburgh, PA (US)

(73) Assignee: GA Industries, Inc., Cranberry Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/117,637

(22) Filed: Apr. 28, 2005

(65) Prior Publication Data
US 2005/0269535 A1 Dec. 8, 2005

Related U.S. Application Data

(63) Continuation of application No. 10/942,062, filed on Sep. 15, 2004, now Pat. No. 6,929,238, which is a continuation-in-part of application No. 10/617,435, filed on Jul. 11, 2003, which is a continuation-in-part of application No. 09/507,273, filed on Feb. 18, 2000, now abandoned.

(51) Int. Cl.
*F16K 31/05* (2006.01)
*F16K 31/48* (2006.01)

(52) U.S. Cl. ............. 251/83; 251/54; 251/129.03
(58) Field of Classification Search ............. 251/42, 251/54, 82, 83, 129.03; 137/496
See application file for complete search history.

(56) References Cited

U.S. PATENT DOCUMENTS

| | | | |
|---|---|---|---|
| 2,135,243 A | 11/1938 | Swain | |
| 2,621,015 A | 12/1952 | MacGregor | |
| 3,045,607 A * | 7/1962 | Lindner | ............ 166/54 |
| 3,707,987 A | 1/1973 | Gordon | |
| 4,008,735 A | 2/1977 | Thompson | |
| 4,364,541 A | 12/1982 | Chabat-Courrede et al. | |
| 4,596,263 A | 6/1986 | Snider | |
| 4,667,696 A | 5/1987 | van Rensburg | |
| 4,945,941 A | 8/1990 | Kocher | |
| 5,036,876 A | 8/1991 | Jernberg | |
| 5,540,558 A | 7/1996 | Harden et al. | |
| 6,126,409 A | 10/2000 | Young | |

FOREIGN PATENT DOCUMENTS

GB 941148 11/1963

* cited by examiner

*Primary Examiner*—Eric Keasel
*Assistant Examiner*—Andrew J. Rost
(74) *Attorney, Agent, or Firm*—The Webb Law Firm

(57) ABSTRACT

An electric motor actuated stop/check valve for industrial use such as liquid pumping systems which has a controlled opening and closing rate when liquid flow is in a forward direction but closes quickly upon reverse flow of liquid with no action from the electric motor actuator.

16 Claims, 9 Drawing Sheets

ELECTRIC MOTOR ACTUATED STOP AND SELF-CLOSING CHECK VALVE

CROSS REFERENCE TO RELATED APPLICATIONS

This application is a Continuation of U.S. application Ser. No. 10/942,062, filed Sep. 15, 2004 now U.S. Pat. No. 6,929,238, which is a Continuation-in-Part of application Ser. No. 10/617,435, filed Jul. 11, 2003, which is a Continuation-in-Part of application Ser. No. 09/507,273, filed Feb. 18, 2000 now abandoned. The contents of application Ser. No. 09/507,273 are hereby incorporated by reference.

BACKGROUND OF THE INVENTION

1. Field of the Invention

This invention relates to electric motor actuated valves incorporating a check valve feature for controlling the flow of pumped liquids in applications such as are associated with municipal water supply or sewage treatment facilities and industry.

2. Description of Related Art

Valves for controlling liquid flow and preventing its back-flow are known in the art and are commonly referred to as stop/check valves. Such valves can be actuated to control liquid flow by manual, hydraulic and other means.

U.S. Pat. No. 4,667,696 describes a stop/check valve which utilizes a ball which closes upon a valve seat to prevent liquid flow in a back-flow direction. Flow in a desired direction is regulated by a hand-cranked closing device acting on the ball.

U.K. Patent specification 941,148 describes a stop/check valve for fluid having a pressure plate extending from a clack into a path of return flow of the fluid so as to urge the clack to a closed position. In an embodiment having control of forward-flow, a hand-actuated spindle is used to position the clack.

U.S. Pat. No. 4,945,941 describes a stop/check valve having a feature facilitating movement of a valve disc to a closed position with back-flow of liquid by use of a ridge on the valve seat and a deflector ring on the valve disc to deflect the flow of the fluid. Control of the liquid for forward-flow is carried out with a hand-actuated valve stem.

SUMMARY OF THE INVENTION

The present invention provides an electric motor actuated valve to control liquid flow in a forward direction, prevent flow of the liquid in a reverse direction and carry out such control while eliminating or reducing liquid surge pressure transients and slamming of components within the valve. A discontinuous connection between a motor actuation component and valve seating components allows valve seating solely by means of liquid acting on the valve seating components to close the valve and prevent liquid back-flow. Such back-flow prevention occurs without action by the electric motor.

DETAILED DESCRIPTION OF THE INVENTION

Figure 1:
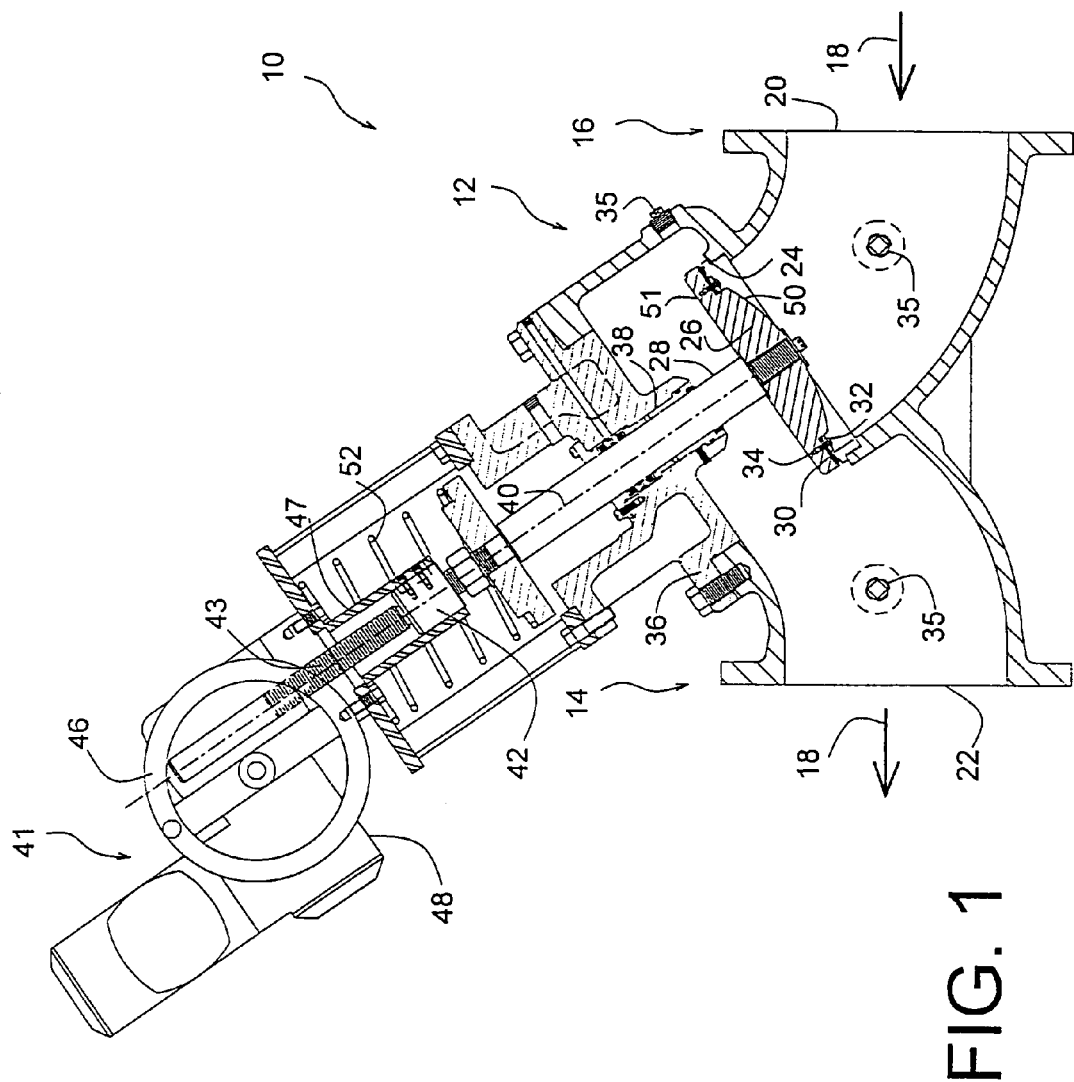
FIG. 1 is a vertical cross-section of a wye valve of the invention with an actuator rod in an extended position and a valve disc in a closed position.
Figure 2:
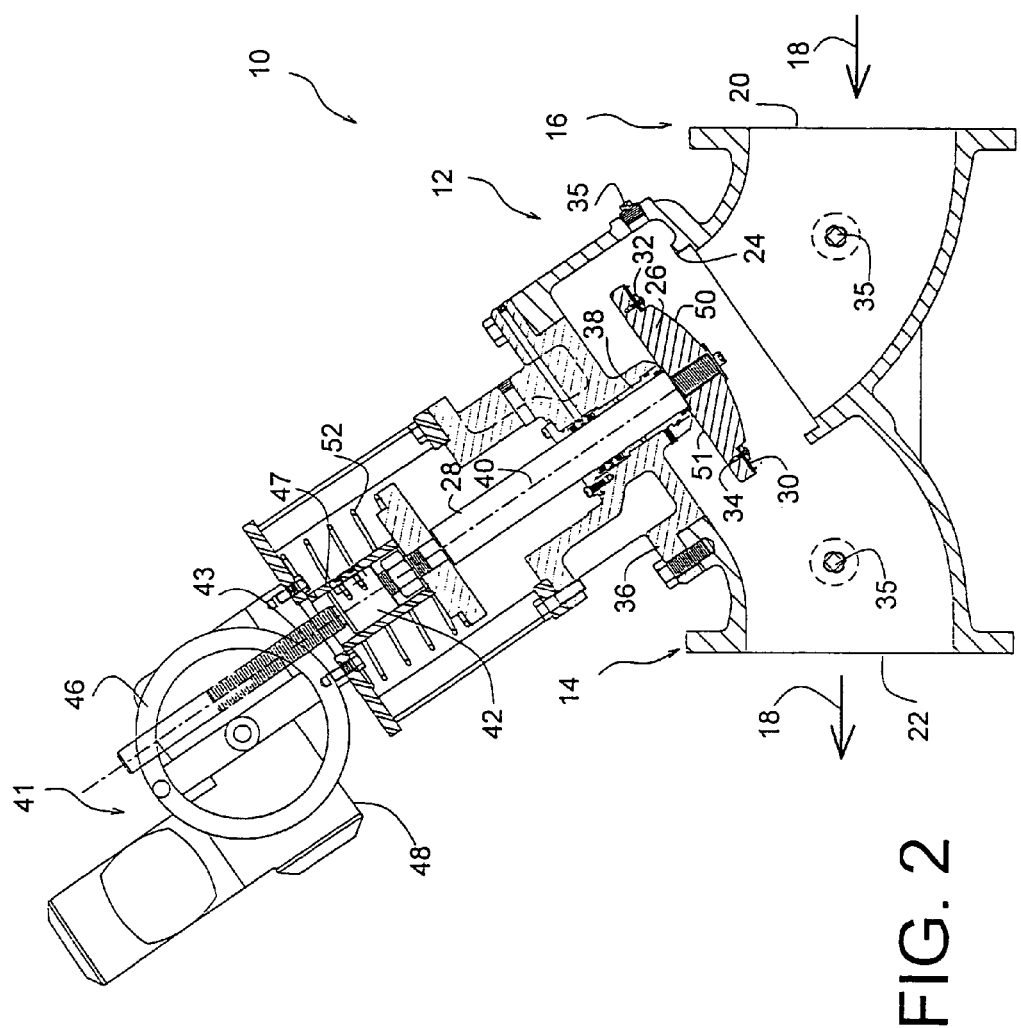
FIG. 2 is a vertical cross-section of the wye valve of FIG. 1 with the actuator rod in a retracted position, the valve disc in an open position and liquid flow in a direction from an inlet port to an outlet port.
Figure 3:
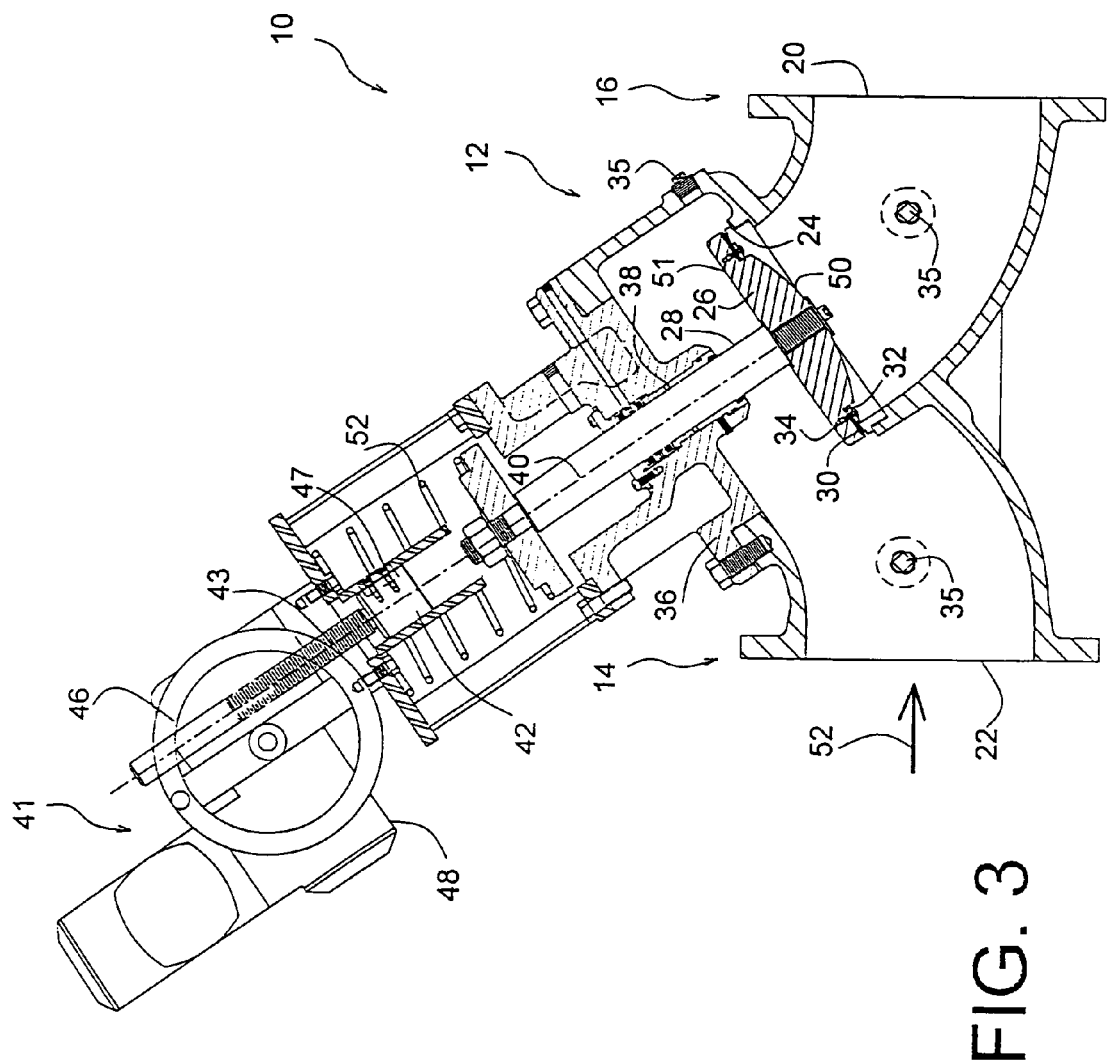
FIG. 3 is a vertical cross-section of the wye valve of FIG. 1 with the actuator rod in a retracted position and the valve disc in a closed back-flow preventing position.

FIGS. 1, 2 and 3 show an embodiment of the invention having a wye valve body which provides control of liquid flow when installed in-line with liquid conveying piping having a linear configuration. Wye valve 10 having valve body 12 is preferably installed in-line with use of flanges 14 and 16 which bolt together with matching flanges of the piping. Liquid flow is normally in the direction of arrows 18 and is referred to in this disclosure as forward-flow. In a typical application such flow would result from action of an up-stream pump. With forward-flow in the direction indicated by arrows 18 a port at 20 is referred to as an inlet port and the remaining port at 22 is referred to as an outlet port. Intermediate such ports and substantially perpendicular to the flow of liquid is a valve seat 24. In a preferred embodiment the seat is annular in shape, is replaceable, and is fabricated of a metallic material such as bronze or stainless steel. The seat can be either threaded and held in place by complimentary threads or pinned in valve body 12, which is preferably of a metallic material such as cast iron or ductile iron. Liquid flow is controlled by interaction of valve seat 24 and a valve disc 26 having an integral disc stem 28. In FIG. 1 valve disc 26, is disposed in a closed position whereat it is in contact with valve seat 24 so as to block the flow of liquid through the valve body. Valve disc 26 in the preferred embodiment is of cast iron or steel and can be fitted with a valve disc seat, 30, of a resilient material such as rubber or UHMWPE (ultra high molecular weight polyethylene) to provide a more positive seal between the valve seat and the valve disc. Such valve disc seat 30 is preferably retained by a bronze or stainless steel follower ring 32 attached to the valve disc with use of stainless steel screws 34. Disc stem 28 is of stainless steel material. Clean-out/inspection ports 35 are provided in valve body 12 to view or gain access to the valve interior.

Disc stem 28 extends through a valve body cover 36 which in the preferred embodiment is provided with a bronze bushing 38 to enable substantially free movement of valve disc 26 and disc stem 28 along longitudinal axis 40 of the disc stem.

FIG. 2 depicts valve disc 26 and stem 28 after movement to a position referred to as the open position whereat liquid flow from inlet port 20 to outlet port 22 is enabled. Such flow position is contrasted with the valve disc position depicted in FIG. 1 which is referred to as the closed position.

The valve of the invention is used in-line to 1) stop flow in the forward direction, 2) control flow in the forward direction (from full flow to a restricted flow) and 3) prevent back-flow (flow in a direction opposite to forward-flow). In the preferred embodiment valve body 12 and valve seat 24 are dimensioned such that the net flow area is no less than the cross-sectional area of the piping to the inlet and outlet ports so as to minimize flow restriction by the valve. That is the liquid does not encounter a cross-section, perpendicular to the direction of flow, which is of less area than the cross-sectional area of the adjacent piping. Configuration of the valve body, valve seat and valve disc is such that dead or non-flow cavities do not exist within the valve body and the valve is therefore said to be "self-cleaning".

Operatively attached to valve body 12 is electric motor actuator 41 having actuator rod 42 positioned to act on valve stem 28. Actuator rod 42 is preferably attached to a threaded shaft 43 which rotates through action of the electric motor to move it linearly along axis 40. In event of loss of power or inoperability of the motor the threaded shaft can be actuated manually with a hand-crank 46. Actuator rod 42 is prevented from rotating with the threaded shaft by an extension from the side of the actuator rod which extends into a slot in anti-rotation sleeve 47. Gears linking electric motor 44 and hand-crank 46 to the threaded shaft are within housing 48. A closed position of the valve as depicted in FIG. 1 is attained by action of actuator rod 42 against disc stem 28 to move the stem and valve disc 26 along longitudinal axis 40 to provide engagement of valve seat 24 with valve disc 26. Contact of actuator rod 42 with disc stem 28 when in such closed position prevents an upward movement of disc stem 28 and valve disc 26 away from valve seat 24 which would result from pressure exerted on face 50 of valve disc 26 by liquid flowing in the direction indicated by arrows 18. Such actuator rod 42 position against disc stem 28 also prevents back flow of liquid in a direction opposite to that indicated by arrows 18.

FIG. 2 shows the position of valve 10 components when full flow of liquid in the forward direction is desired. Actuator rod 42 is at a retracted position by action of threaded shaft 43 rotated by electric motor 44. Once the actuator rod is retracted valve disc 26 and disc stem 28 move in an upward direction along longitudinal axis 40 to position valve disc 26 to be spaced from valve seat 24 by sole action of the liquid flowing in the direction of arrows 18 and exerting pressure on face 50 of valve disc 26. Actuator rod 42 is not connected to disc stem 28 and such lack of connection is an important feature of the invention and is relied on for prevention of back-flow of liquid which is described below. Although not shown, liquid flow can be regulated to selected rates by positioning valve disc 26 between extreme positions depicted in FIGS. 1 and 2, however the valve is not normally used for such function.

As described above, the electric motor actuated stop and self-closing check valve of the invention can be used in municipal water supply systems or sewage treatment systems as a pump control and stop check valve although it is not limited to such usage. In normal operation liquid flow is in the direction indicated by arrows 18 with such flow provided by action of at least one pump upstream of the valve. In event of pump shutdown, either intended or by a power failure, back-flow of the liquid can occur when a valve to check such flow is not provided. Such back-flow is usually undesirable and is prevented by the valve of the invention without any action by the electric motor. Such feature is of importance when back-flow is caused by a power failure and power is not available to the electric motor.

In FIG. 3 such back-flow direction is indicated by arrow 52 and is in a direction from outlet port 22 toward inlet port 20. In event of a pump shutdown liquid pressure provided by the pump and acting on face 50 of valve disc 26 would no longer be present and valve disc 26 would be free to move in a downward direction so as to cover valve seat 24 and prevent the back-flow of liquid. Such downward movement of the valve disc occurs by force of gravity acting on the freely moveable valve disc and disc stem and also by a momentary back-flow of liquid which results in pressure being greater on back face 51 than on front face 50 of valve disc 26. Such pressure difference closes and holds the valve disc against valve seat 24 until such pressure difference is reversed, such as by restarting of the pump. Such free movement along disc stem longitudinal axis 40 can take place because of the lack of connection between disc stem 28 and actuator rod 42.

A common problem with many check valves when a reversal of liquid flow direction occurs is "slamming" of the valve disc against the valve seat. Such slamming is greatly reduced in the valve of this invention by use of a compression spring 52 which biases the valve disc and its stem toward the closed position. Selection of spring characteristics is dependent on pressure of the liquid being pumped against valve disc face 50. The spring is selected to be strong enough to assist in closing the valve when flow in the forward direction stops so that the valve is at least partially closed when the back-flowing liquid applies pressure to valve disc back face 51 and any slamming of the valve disc is reduced or eliminated because of the shortened distance it moves. The spring can not be so strong as to restrict flow in the forward direction in a significant amount. Spring 52 is shown in a partially compressed state in FIG. 2, and in an extended state in FIGS. 1 and 3.

Figure 4:
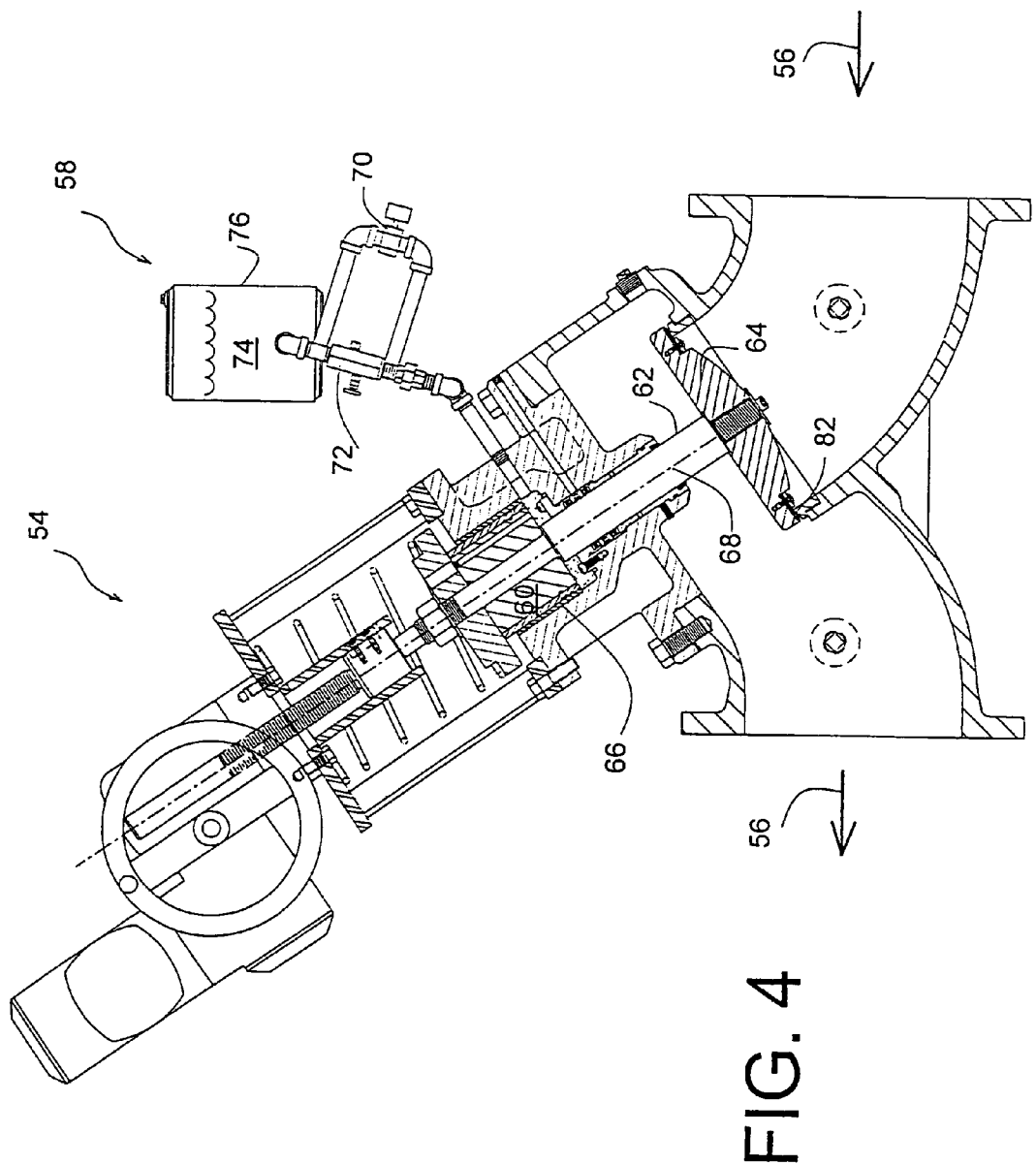
FIG. 4 is a vertical cross-section of a wye valve embodiment of the invention having a closing speed regulator, an actuator rod in an extended position and a valve disc in a closed position.
Figure 5:
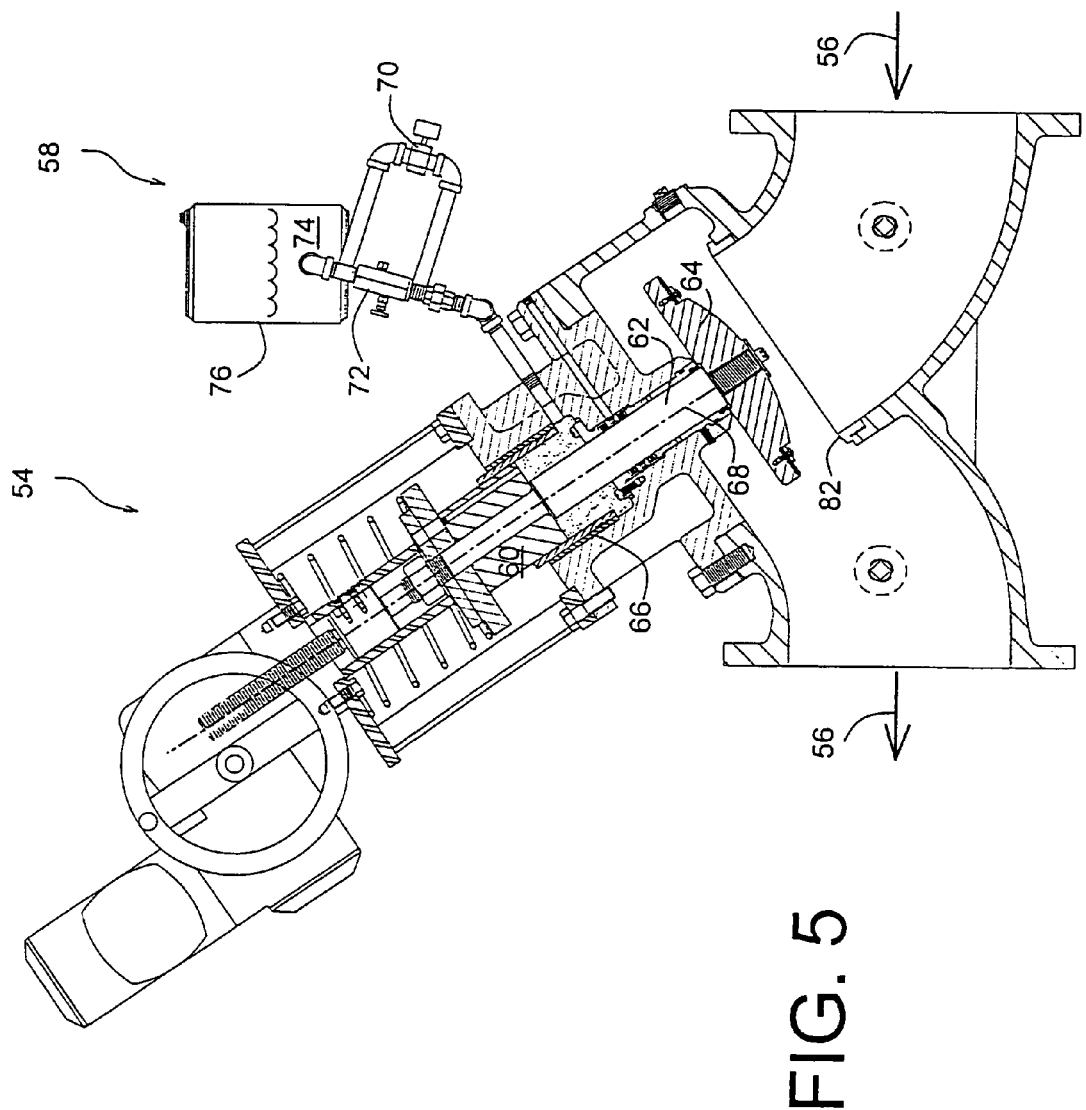
FIG. 5 is a vertical cross-section of the wye valve of FIG. 4 with the actuator rod in a retracted position, the valve disc in an open position, and forward liquid flow in a direction from an inlet port to an outlet port.
Figure 6:
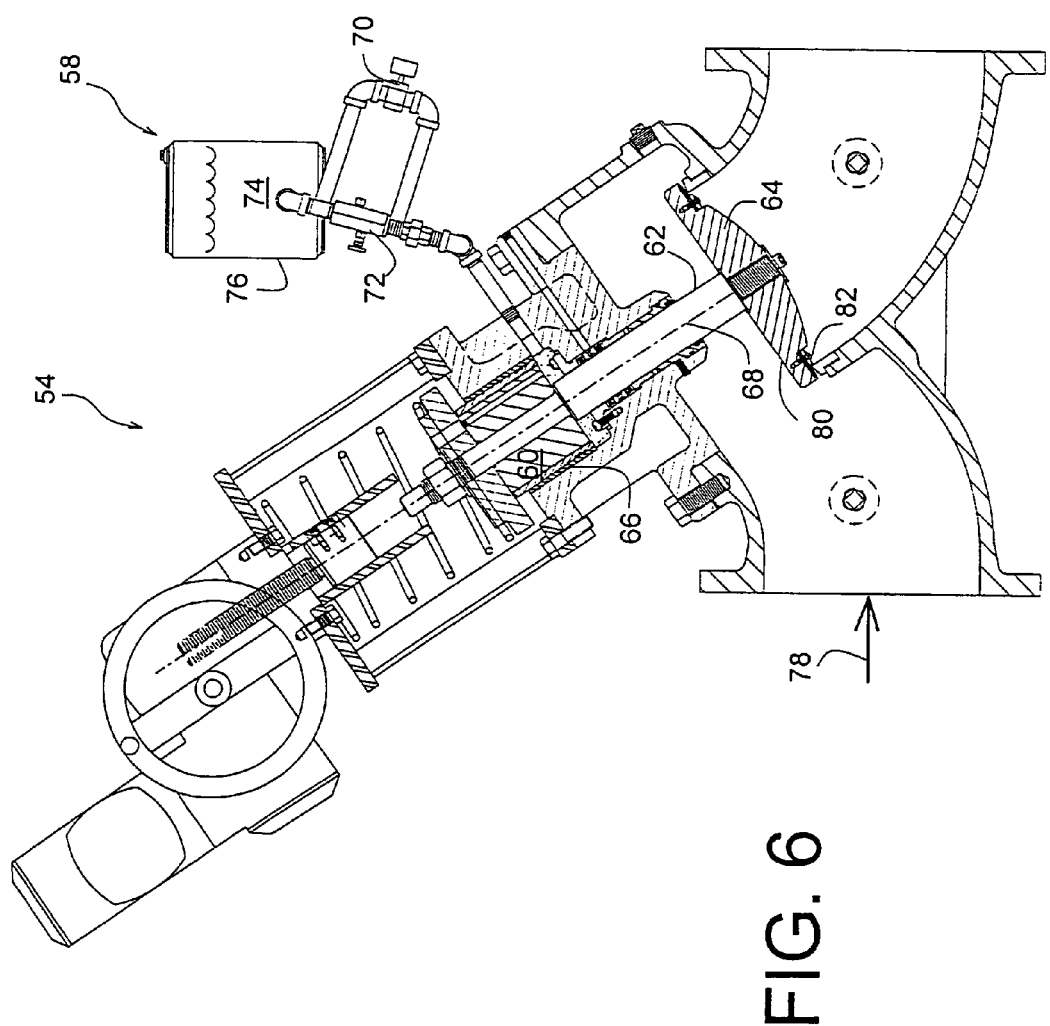
FIG. 6 is a vertical cross-section of the wye valve of FIG. 4 with the actuator rod in a retracted position and the valve disc in a closed back-flow preventing position.

FIGS. 4-6 show a second embodiment of a wye valve of the invention which includes a second component, in addition to the spring, to reduce or eliminate valve disc slamming. Wye valve 54 of FIGS. 4-6 with forward-flow indicated by arrows 56, is similar to valve 10 of FIGS. 1-3, with the exception of an added hydraulic closing-speed regulator indicated generally at 58. Such regulator consists of piston 60 attached to an upper end of disc stem 62, cylinder sleeve 66, solenoid valve 70, check/needle valve 72, hydraulic oil 74, hydraulic oil reservoir 76, and associated piping. Piston 60 is free to move linearly along axis 68 in cylinder sleeve 66 with movement of valve disc 64. The hydraulic closing-speed regulator operates so as to slow down valve closing during a reversal of liquid flow direction with substantially no effect on valve opening speed. The hydraulic circuit of the closing-speed regulator is shown in schematic form in FIG. 7. Shown are piston 60, cylinder 66, solenoid valve 70, check/needle valve 72, hydraulic oil reservoir 76 and hydraulic oil 74. Solenoid valve 70 is open when energized and closes when not energized. Referring to FIGS. 4-7, when valve disc 64 is "opening" with movement in the direction indicated by arrow 78 (FIG. 7), flow of hydraulic oil is in the direction indicated by arrow 80. When valve disc 64 is "closing" piston 60 moves in the direction indicated by arrow 79 and hydraulic oil flow is in the direction indicated by arrow 82. During planned opening and closing, when loss of power is not a factor, and slamming of valve disc 64 is not a factor, solenoid valve 70 is energized and open so as to not require liquid flow through check/needle valve 72 (although a small flow can occur), and operational speed of the valve being operated by the electric motor is not affected.

Figure 7:
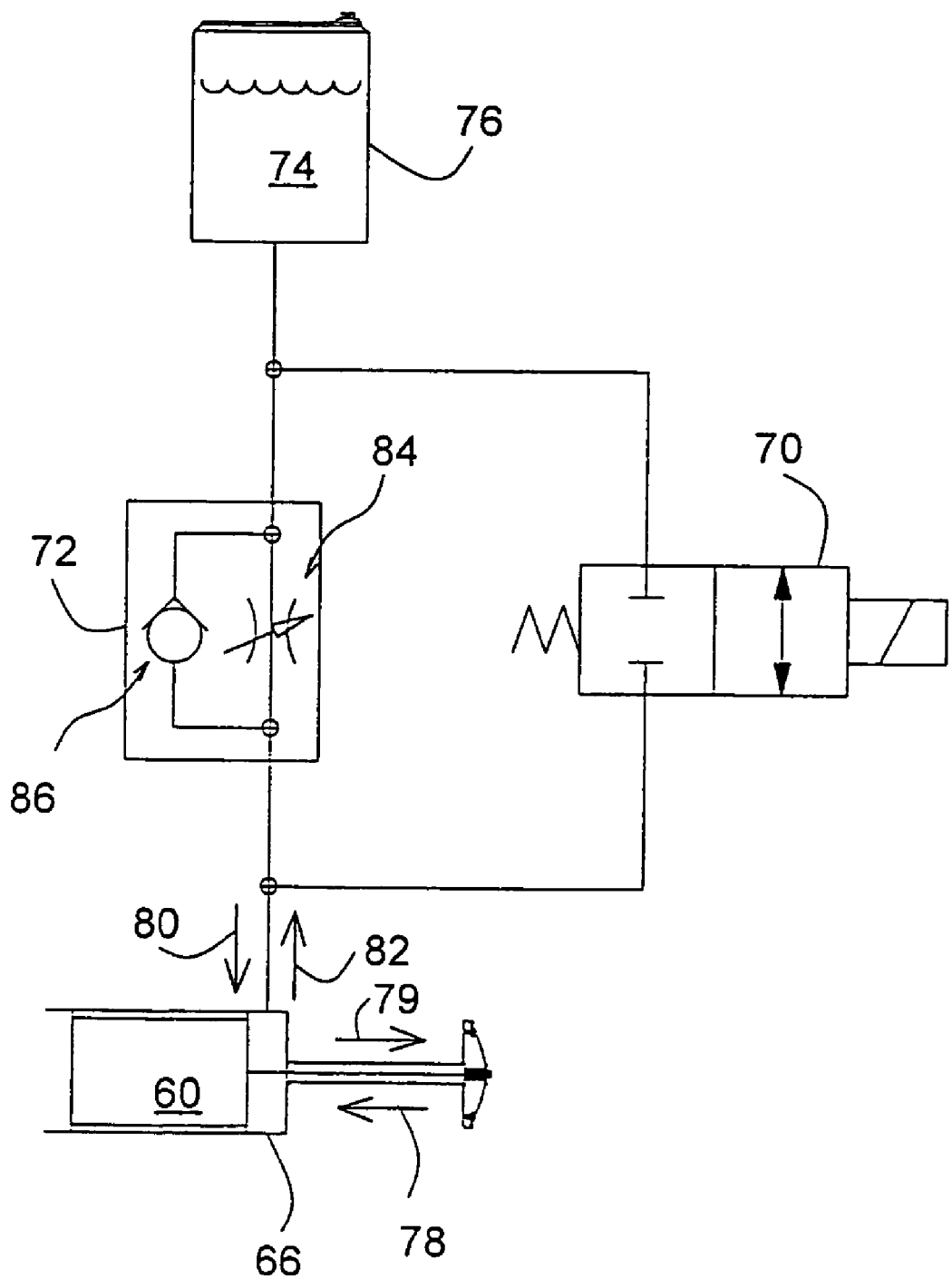
FIG. 7 is a schematic diagram of a valve closing speed regulator of the invention.

During loss of power, when liquid flow is no longer in the direction of arrows 56 and back-flow is beginning in the direction of arrow 78 (FIG. 6), liquid pressure against back face 80 of valve disc 64 could, without closing-speed regulator 58, slam valve disc 64 against valve seat 82. To eliminate such slamming solenoid valve 70 closes upon loss of power requiring flow of hydraulic oil through check/needle valve 72 in the direction indicated by arrow 82. Valve 72 has two channels in parallel as best seen in FIG. 7. One channel includes needle valve 84 which adjustably controls hydraulic oil flow rate and the remaining channel includes check valve 86 which permits flow only in the downward direction (as when valve disc is opening). During valve disc closing, caused by liquid back-flow, hydraulic oil flow is in the direction indicated by arrow 82 and the hydraulic oil is forced to flow through the restricted channel of needle valve 84 at a controlled rate, thus slowing the movement of valve disc 64 against valve seat 82 and eliminating slamming. Such rate of closing is regulated by adjustment of the needle valve opening.

Figure 8:
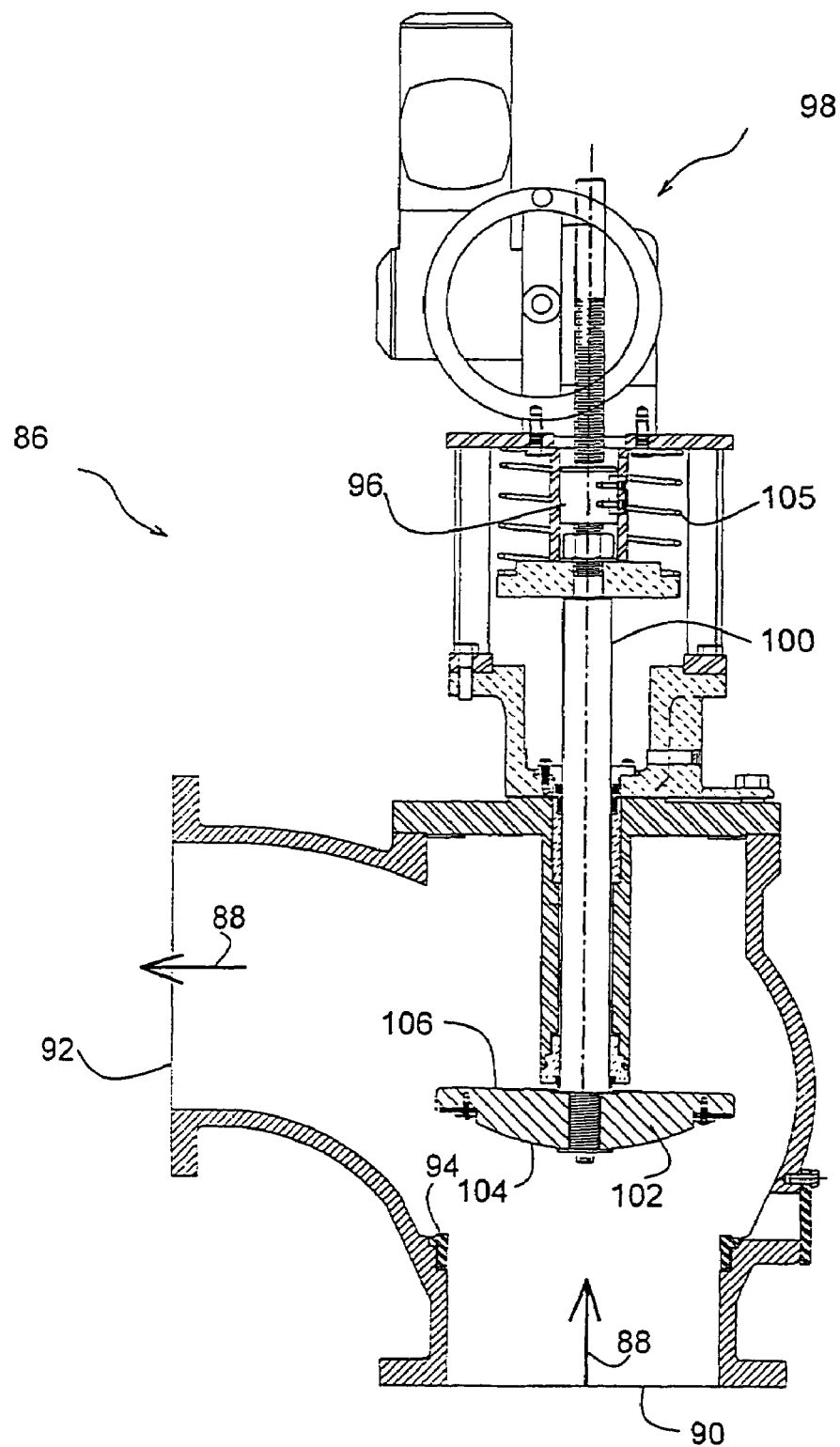
FIG. 8 is a vertical cross-section of an elbow valve embodiment of the invention with the actuator rod in a retracted position and the valve disc in an open position for forward liquid flow in a direction from an inlet port to an outlet port.

FIG. 8 shows another embodiment of the invention, an elbow valve 86 for use in a liquid conveying pipeline wherein a 90° pipeline configuration is available for placement of a valve. Normal liquid flow in a forward direction is indicated by arrows 88. During normal operation, liquid flows from entry port 90 to outlet port 92 through valve seat 94. As in the wye valve of FIGS. 1-6 valve closure is carried out by movement of actuator rod 96 downward by action of electric motor 98 to contact disc stem 100 to dispose valve disc 102 to cover valve seat 94 and achieve a closed position. Elbow valve 98 of FIG. 8 is depicted in the open position wherein valve disc 102 is spaced from valve seat 94. Operation of elbow valve 98 is the same as wye valve 10 (FIGS. 1-6). The valve disc position depicted in FIG. 8 is maintained by pressure of the liquid acting against face 104 of valve disc 102. In the event of flow stoppage in the direction indicated by arrows 88, back-flow of liquid is prevented by the action of gravity and spring 105 on freely moveable valve disc 102 and disc stem 100, and momentary action of the back-flowing liquid on back-face 106 of valve disc 102 to move such disc downward to contact valve seat 94 and terminate the back-flow. Continued pressure on back face (106) maintains the valve in the back-flow preventing position.

Although elbow valve 88 with solely spring means 105 for reducing or eliminating valve disc slamming is shown, such elbow valve can be provided with hydraulic closing speed regulating means as shown and described for wye valve 10 (FIGS. 4-6) and operation of the two types of valves is the same.

Figure 9:
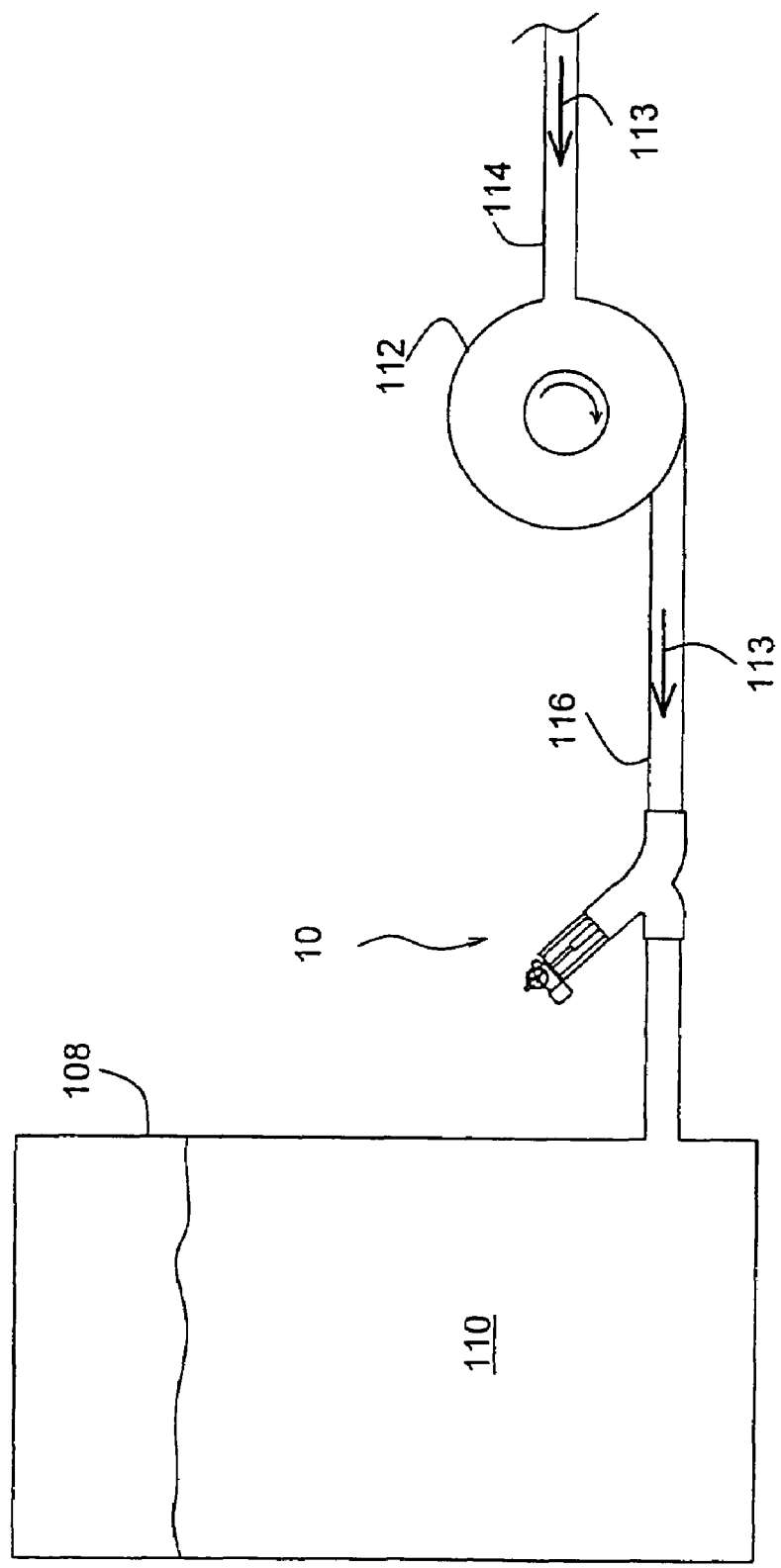
FIG. 9 is a schematic diagram for describing a method of operating a pumping system with use of a wye valve of the invention.

A preferred method of operating a liquid pumping system utilizing a valve of the invention is schematically shown in FIG. 9. The system can be used in applications such as a municipal water supply system or a sewage treatment system. In FIG. 9 tank 108 is filled with liquid 110 by means of pump 112 acting on it. Pump input line 114 supplies the liquid to pump 112 and it is discharged through pump discharge line 116 toward liquid tank 108. An electric motor actuated stop and self-closing check valve 10 of the invention having a wye configured body is installed to function as a pump control and stop check valve in liquid discharge line 116. A common problem in water and sewage systems utilizing such a pumping arrangement is liquid surge pressure transients and slamming of check valve components during pumping start-up and termination. Such problem is substantially eliminated with use of valve 10 in liquid discharge line 116. In the preferred method of operation for pumping start-up, valve 10 is set to the closed position (FIG. 1) prior to start-up of pump 112. That is actuator rod 42 is extended to locate and hold valve disc 26 against valve seat 24. The pump is then started followed by opening of valve 10 toward the flow position (FIG. 2) at a selected rate with use of electric motor 41. Such rate is controllable by motor control devices known in the art (not shown). Full flow position (FIG. 2) is maintained during normal pumping operation. To achieve planned pumping shutdown without generating liquid surge pressure transients or valve component slamming, valve 10 is closed, or nearly closed, with use of electric motor 41 prior to shut-down of pump 112. Following complete closure of the valve, or at a point nearing complete valve closure, the pump is switched off. Such sequential start-up and shut-down procedure can be conveniently controlled with use of switches and controls which coordinate the operation of the valve and the pump.

During normal pumping operation of the pumping system with flow of liquid in the direction of arrow 113, and actuator rod 42 in the retracted position (FIGS. 2 and 3) valve disc 26 is free to move in the direction toward valve seat 24 and close the valve to prevent back-flow of the liquid in the event of failure of pump 112 or loss of electrical power. No action is required by the electric motor for such back-flow preventing closing as the valve is closed by action of the liquid flowing in a direction opposite to the direction of arrow 113. Spring 52 at least partially moves valve disc 26 toward the closed position during momentary liquid flow reversal from forward-flow to back-flow and valve disc slamming is eliminated or reduced. Such configuration and operating procedure for the pumping system enables conveying of liquid without undesirable liquid surging and slamming.

While specific materials and configurations have been set forth for purposes of describing embodiments of the invention, various modifications can be resorted to, in light of the above teachings, without departing from applicants' novel contributions; therefore in determining the scope of the present invention reference shall be made to the appended claims.

What is claimed is:

1. An electric motor actuated stop and self-closing check valve for controlling forward and back-flow of liquid in a liquid conveying line and reducing liquid surge pressure transients and slamming of valve components, comprising:
   A) a valve body having an inlet port and an outlet port, relative to forward-flow of a liquid,
   B) a valve seat disposed within the valve body intermediate said ports,
   C) a valve disc disposed within the valve body having an elongated disc stem which extends through the valve body,
   said valve disc and disc stem being free to move along the longitudinal axis of said valve stem to either:
   i) a closed position whereat the valve disc sealingly engages the valve seat to prevent forward and back-flow of the liquid, or
   ii) an open position whereat the valve disc is spaced from the valve seat,
   D) an electric motor operationally attached to said valve body,
   E) an actuator rod moveable by action of the electric motor to be disposed at either:

i) an extended position whereat the actuator rod contacts the valve stem and restrains the valve disc at the closed position preventing forward and back-flow of the liquid, or ii) a retracted position whereat the actuator rod is retracted and the valve disc is free to move along the longitudinal axis of the valve stem, without action by the electric motor, such that:

a) the valve disc moves to the open position solely through action of forward flowing liquid on the valve disc and forward flow of the liquid occurs, and b) the valve disc moves to the closed position through action of momentary back-flowing liquid on the valve disc and said liquid back-flow is prevented, and F) a hydraulically operated valve disc closing-speed regulator operatively attached to the valve to control the closing speed of the valve disc, wherein said closing-speed regulator comprises:

i) a cylinder operatively attached to the valve body, ii) a piston operatively attached to the disc stem for movement within said cylinder along its longitudinal axis, and iii) a hydraulic oil reservoir with connecting piping to the cylinder, said connecting piping having a check/needle valve.

2. An electric motor actuated stop and self-closing check valve according to claim 1, further comprising a compression spring biasing the valve disc toward the closed position to move the valve disc toward the closed position following stoppage of liquid flow in the forward direction.

3. An electric motor actuated stop and self-closing check valve according to claim 1, wherein said valve body has a wye configuration or an elbow configuration.

4. An electric motor actuated stop and self-closing check valve according to claim 1, wherein net flow area of the valve is no less than the cross-sectional area of the liquid conveying line and the valve is self cleaning.

5. An electric motor actuated stop and self-closing check valve according to claim 1, wherein the valve body is of cast iron.

6. An electric motor actuated stop and self-closing check valve according to claim 1, further including a flange on the inlet port and a flange on the outlet port of the valve body.

7. An electric motor actuated stop and self-closing check valve according to claim 1, wherein said valve seat is replaceable and is fabricated of bronze or stainless steel.

8. An electric motor actuated stop and self-closing check valve according to claim 1, further including at least one clean-out/inspection port disposed in the valve body.

9. An electric motor actuated stop and self-closing check valve according to claim 1, wherein said valve disc is of cast iron or steel.

10. An electric motor actuated stop and self-closing check valve according to claim 1, further comprising a renewable resilient seat on said valve disc.

11. An electric motor actuated stop and self-closing check valve according to claim 10, wherein said renewable resilient seat is of rubber or UHMWPE (ultra high molecular weight polyethylene).

12. An electric motor actuated stop and self-closing check valve according to claim 10, further comprising a follower ring for retaining the renewable resilient seat.

13. An electric motor actuated stop and self-closing check valve according to claim 12, wherein said follower ring is of bronze or stainless steel.

14. An electric motor actuated stop and self-closing check valve according to claim 1, wherein said valve stem is of stainless steel.

15. An electric motor actuated stop and self-closing check valve according to claim 1, further including a bushing disposed between the disc stem and the valve body for guiding and facilitating the free movement of the valve disc and disc stem along the longitudinal axis of the disc stem.

16. A method of operating a liquid pumping system, having at least one pump and a pump liquid-discharge line, to control forward and back-flow of liquid and reduce slamming of valve components and liquid surge pressure transients, comprising providing an electric motor actuated stop and self-closing check valve in the liquid-discharge line, comprising:

A) a valve body having an inlet port and an outlet port, relative to forward flow of a liquid, B) a valve seat disposed within the valve body intermediate said ports, C) a valve disc disposed within the valve body having an elongated disc stem which extends through the valve body, said valve disc and disc stem being free to move along the longitudinal axis of said valve stem to either:

i) a closed position whereat the valve disc sealingly engages the valve seat to prevent forward-flow and back-flow of the liquid, or ii) an open position whereat the valve disc is spaced from the valve seat, D) a compression spring external to said valve body for providing a selected bias to said valve disc and disc stem toward said closed position, E) an electric motor operationally attached to said valve body, F) an actuator rod moveable by action of the electric motor to be disposed at either:

i) an extended position whereat the actuator rod contacts the valve stem and restrains the valve disc at the closed position preventing forward and back-flow of the liquid, or ii) a retracted position whereat the actuator rod is retracted any amount from said extended position, and at all selectable retracted positions of said actuator rod the valve disc is moveable along the longitudinal axis of the disc stem, without further action by the electric motor, such that:

a) the valve disc moves to the open position solely through action of forward flowing liquid on the valve disc and forward-flow of the liquid occurs, and b) the valve disc moves to the closed position through action of said compression spring and momentary back-flowing liquid on the valve disc and said liquid back-flow is prevented; then, when forward flow pumping is desired:

extending the actuator rod to its extended position, with use of the electric motor, to contact the valve stem and restrain the valve disc at the closed position; then starting the pump to provide for potential flow of the liquid in the forward flow direction of the valve; then retracting the actuator rod at a selected rate to the retracted position to enable forward flow of the liquid; and when termination of liquid flow in the forward direction is desired:

extending the actuator rod at a selected rate toward the extended position, with use of the electric motor, so as to move the valve disc toward the closed position, then, when the valve disc is at a selected position at or near the closed position, stopping the pump, and if the valve is not in the closed position continuing to extend the actuator rod to position the valve disc on the valve seat.

* * * * *